A. R. KECKRITZ.
SPRING GOVERNOR HITCH FOR PLOWS.
APPLICATION FILED AUG. 16, 1917.
1,273,069.
Patented July 16, 1918.
2 SHEETS—SHEET 1.
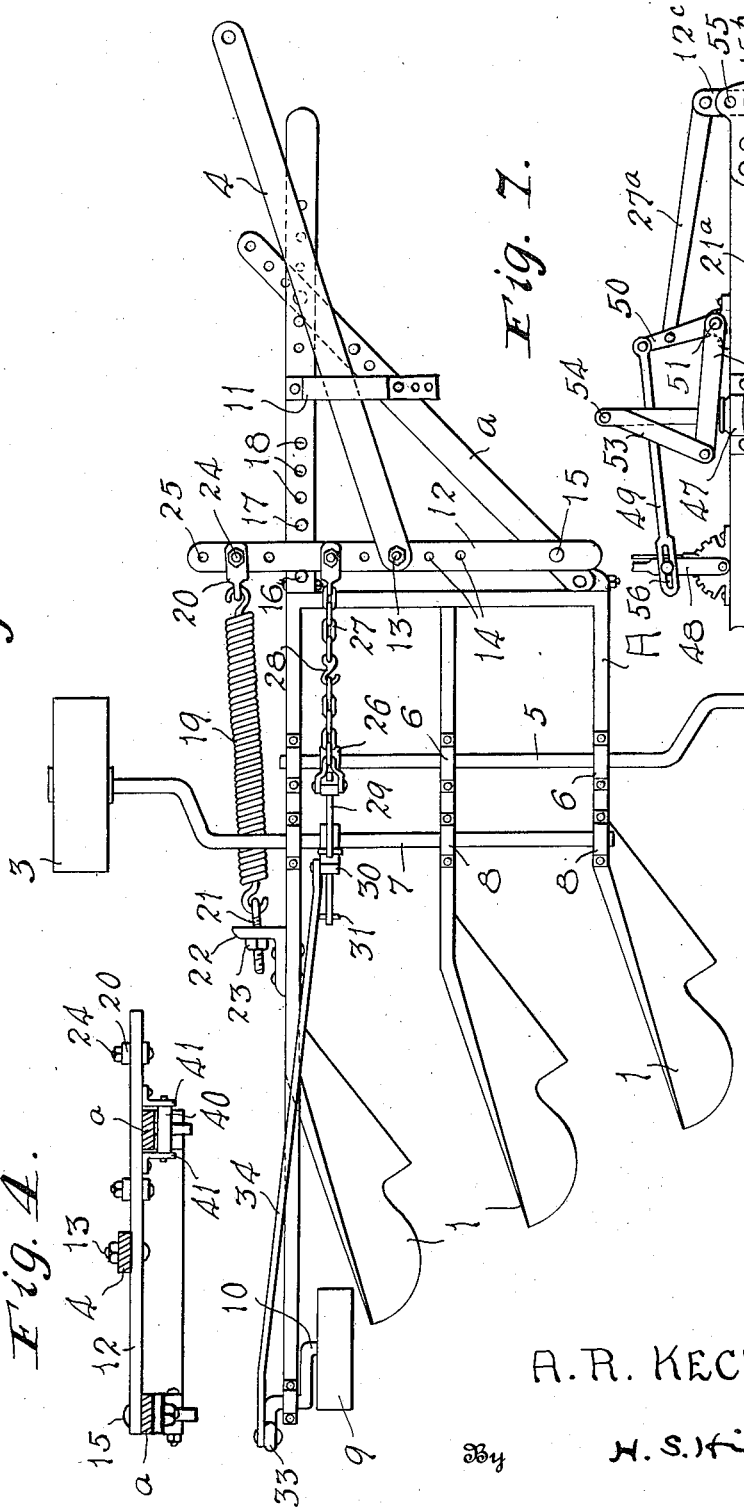
Inventor
A. R. KECKRITZ
By H. S. Kiel
Attorney

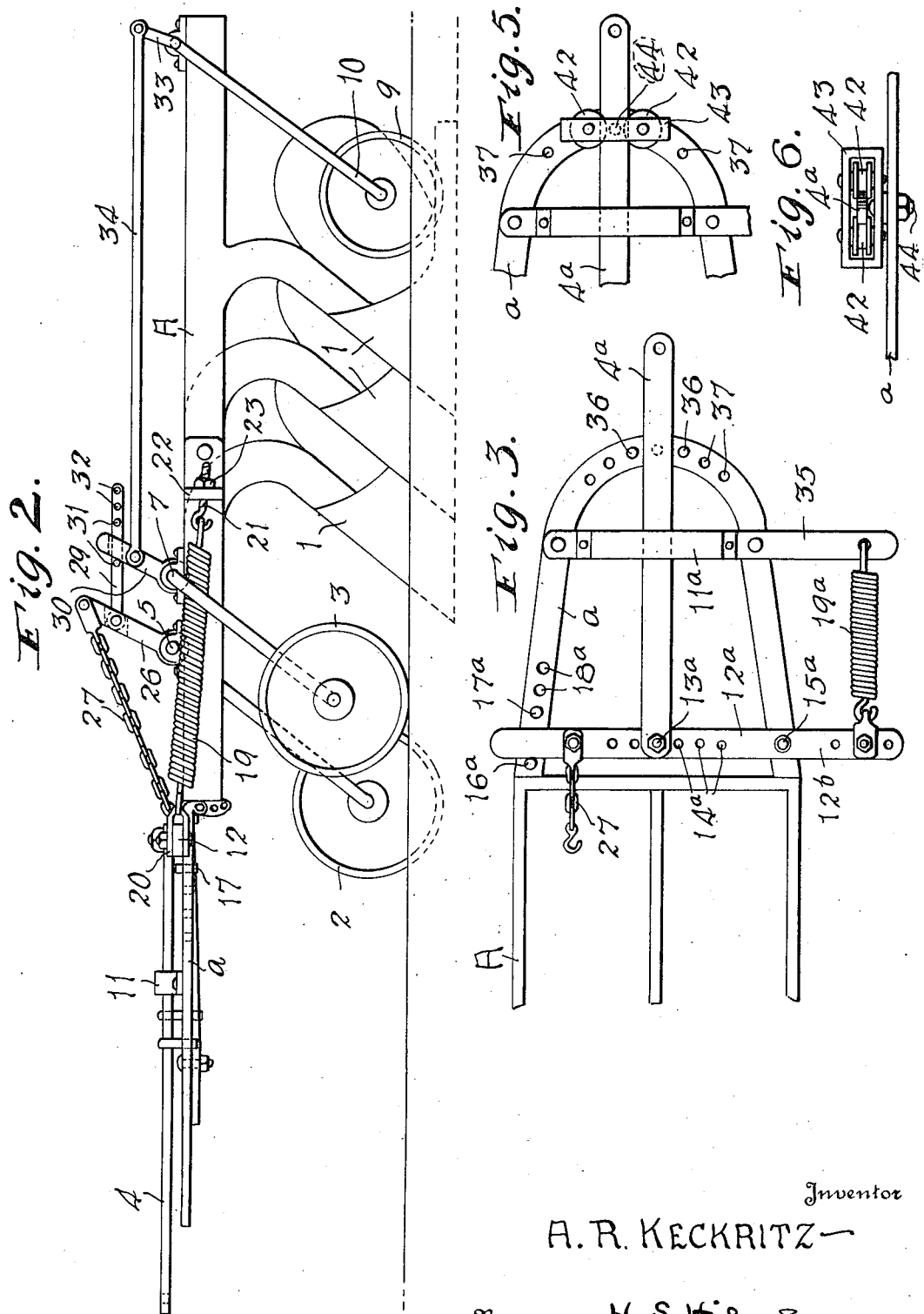

UNITED STATES PATENT OFFICE.

ANTON RUDOLPH KECKRITZ, OF UNION, OREGON.

SPRING-GOVERNOR HITCH FOR PLOWS.

1,273,069.　　　　　　Specification of Letters Patent.　　Patented July 16, 1918.

Application filed August 16, 1917. Serial No. 186,547.

*To all whom it may concern:*

Be it known that I, ANTON RUDOLPH KECKRITZ, a citizen of the United States, residing at Union, in the county of Union, State of Oregon, have invented a new and useful Spring-Governor Hitch for Plows; and I do hereby declare the following to be a full, clear, and exact description of the invention, such as will enable others skilled in the art to which it appertains to make and use the same.

The present invention relates to a spring governor hitch for plows, and has for its object to provide a device of this character which embodies novel features of construction whereby the depth at which the plow operates is automatically controlled by the draft necessary to pull the plow, the plow points being raised when the draft increases and lowered when the draft decreases.

Further objects of the invention are to provide an automatic depth governing device for plows which is comparatively simple and inexpensive in its construction, which will maintain an even depth of plowing at all times, and in connection with all kinds of soil, which can be easily and quickly adjusted to obtain the best results under any particular conditions, and which when used in connection with a motor driven plow will avoid the necessity of using a wooden brake pin.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a three bottom plow constructed in accordance with the invention.

Fig. 2 is a side elevation of the same.

Fig. 3 is a plan view of the forward end of the plow frame, showing one of many possible modifications of the invention.

Figs. 4, 5 and 6 are detail views of further modifications of the invention.

Fig. 7 is a fragmentary side elevation of another form of plow showing a modification of the invention applied thereto.

Corresponding and like parts are referred to in the following description and indicated in all the views of the drawings by the same reference characters.

While the invention is susceptible of being carried out in many different ways, I have illustrated and described one possible embodiment thereof for the purpose of showing the principle upon which the invention operates. The reference character A illustrates diagrammatically the main frame of a plow which carries a series of plows 1, the frame being supported upon a furrow wheel 2 and land wheel 3, and being adapted to be pulled across a field by power applied to a draft bar 4. The furrow wheel 2 is mounted upon a crank axle 5 which extends transversely across the frame A and is journaled within suitable bearings 6 thereon. In a similar manner the land wheel 3 is mounted upon a crank axle 7 which also extends transversely across the frame A, being journaled in suitable bearings 8 thereon. A third wheel 9 may also be provided at the rear end of the plow, if desired, said wheel being similarly mounted upon a crank axle 10 which is journaled upon the rear end of the plow frame.

The draft bar 4 passes slidably through a guide member 11 applied to the forward end of an extension *a* of the main frame A, the rear end of the draft bar being pivotally connected to a depth governing lever 12 by means of a removable pivot pin 13 adapted to be inserted through any selected one of a series of openings 14 in the said lever. This depth governing lever 12 is shown as being horizontally disposed, and as pivotally connected to one side of the frame extension *a* at 15, and slidably engaging the other side of the frame extension *a* between a fixed stop 16 and an adjustable stop 17 which is adapted to be inserted into any selected one of a series of openings 18. A longitudinally extending tension spring 19 has the forward end thereof adjustably connected by a clip 20 to the swinging end of the depth governing lever 12, while the rear end thereof engages the hooked end of an adjusting bolt 21 which passes slidably through an angular bracket 22 secured in a fixed position upon the plow. A nut 23 is threaded upon the adjusting bolt 21 so that the tension in the spring 19 can be increased or decreased, as desired. The clip 20 is adjustably attached to the depth regulating lever 12 by means of a pin 24 which can be inserted through any selected one of a series of openings 25.

The crank axle 5 of the furrow wheel 2 is provided with a crank arm 26 which has the upper end thereof connected by a chain 27 to the lever 12, a hook 28 being interposed in the length of the chain so that the effective length of the said chain can be increased or decreased, as may be found necessary. A link 29 is pivotally connected to the crank arm 26 of the crank axle 5, and passes loosely through an opening in a similar crank arm 30 applied to the crank axle 7. Stop pins 31 are inserted through selected ones of a series of openings 32 in the link member, and are arranged upon opposite sides of the crank arm 30 so that the link 29 has a limited amount of play through the opening of the said crank arm, although when the extent of the movement of the link in either direction exceeds a predetermined amount one of the stop pins will engage the crank arm 30 and produce a rotation of the crank axle 7. It will be understood that the movements of these crank axles operate to raise and lower the main frame A with respect to the wheels 2 and 3, and consequently govern the depth at which the plows operate. Where a third wheel, such as the wheel 9, is provided at the rear end of the plow frame, the crank axle thereof is provided with a crank arm 33 which is connected by a link 34 to the crank arm 30 of the axle 7, thereby causing the crank axles 10 and 7 to move in unison.

In the operation of the plow the wheels are initially set for causing the plows to operate at an average depth. The draft upon the bar 4 for pulling the plow is transmitted to the main frame through the depth governing lever 12 which is engaged at its swinging end by a spring 19. An excessive pull upon the draft bar, caused by the plows operating too deeply, or meeting with an obstruction, will cause the lever 12 to swing forwardly against the action of the spring 19. This will cause the chain connection 27 to pull upon the crank arm 26 of the axle 5 and rotate the latter to lower the furrow wheel 2, thereby raising the plows and decreasing the draft. Should the initial lowering of the furrow wheel 2 not be sufficient to raise the plows and reduce the draft, the rear stop member 31 of the link 29 will engage the crank arm 30 of the other crank shaft 7 and lower both the land wheel 3 and the rear wheel 9. This will raise the plows to the necessary extent for reducing the draft or passing over an obstruction, and as soon as the draft has been reduced the lever 12 will return to its original position under the action of the spring 19, the plow being thus caused to operate at a uniform depth. In a reverse manner, should the draft necessary to pull the plows decrease, the lever 12 will swing rearwardly and rotate one or more of the crank axles to raise the corresponding wheels and lower the plows. After the device has once been set to operate a preferred depth, the regulation is entirely automatic, being governed by the draft or pull which is necessary for operating the plow.

A slight modification is shown by Fig. 3, in which the forward extension $a$ of the main frame has a curved forward end, being provided at an intermediate point with a cross bar 35 which is rigidly secured thereto and projects from one side of the frame. The depth governing lever $12^a$ is pivotally connected to the frame at $15^a$, being provided at its pivot end with an extension $12^b$ which is connected to the end of the rigid cross bar 35 by a tension spring $19^a$. This spring $19^a$ corresponds to the spring 19, operating in substantially the same manner upon the lever $12^a$. The draft bar $4^a$ is slidable through a keeper $11^a$ fitted upon the forward end of the frame extension $a$, and has a limited lateral swinging movement between the adjustable stop members 36 which are fitted in selected ones adjustably held in position by means of fastening members 36 of a series of openings 37. The rear end of the draft bar is pivotally connected to the lever $12^a$ by means of a pin $13^a$ which is adapted to engage any selected one of a series of openings $14^a$ in the lever $12^a$. The swinging end of the lever $12^a$ slidably engages the frame extension $a$, being movable between a fixed stop $16^a$, and an adjustable stop $17^a$ adapted to be inserted in any selected one of a series of openings $18^a$. The chain 27 connects the lever $12^a$ to the crank arm 26 of the crank axle 5, exactly as in the previous instance. The pull of the draw bar is transmitted to the frame of the plow through the lever $12^a$ and spring $19^a$, and any excessive draft will cause the free end of the lever to swing forwardly against the action of the spring $19^a$, thereby pulling upon the chain or cable 27 and rotating one or more of the crank axles to lower the corresponding wheels and raise the plows. In a reverse manner, any decrease in the amount of draft necessary to pull the plow will permit the depth governing lever $12^a$ to swing rearwardly under the action of the spring $19^a$, with the result that one or more of the supporting wheels will be raised and the frame lowered thereby increasing the depth at which the plow operates.

It will be noted with reference to Fig. 2 of the drawing that the pull of the chain 27 upon the depth governing lever 12 is both upwardly and horizontally, and while the upward pull is somewhat counteracted by the keeper 11 it may be desirable in some instances to provide more positive means for preventing the depth governing lever 12 from being broken at its pivot 15. One possible arrangement is shown by Fig. 4 of the drawing, in which a roller 40 is arranged on the underside of the side bar of the extension frame a over which the free end of the depth governing lever slides, the said roller being journaled in brackets 41 secured to the lever 12 and arranged upon opposite sides of the said side bar of the extension frame a. With this arrangement the roller 40 prevents any upward movement of the depth governing lever which might be caused by the pull of the chain 27, and the roller also provides an antifriction bearing so as not to cause any undue friction between the depth governing lever 12 and the extension frame a as the lever slides on the said extension a.

A still further modification of the invention is shown by Figs. 5 and 6, in which guide rollers are provided to guide the movement of the draft bar 4ª instead of the pins 36 shown by Fig. 3. A pair of grooved guide rollers 42 are shown as journaled within a looped keeper frame 43, and one roller arranged upon each side of the draft bar 4ª, the draft bar being slidably mounted within the grooves of the rollers 42. The looped keeper 43 is pivotally mounted upon the extension frame a by means of a bolt 44 which is inserted through one of the openings 37 in the extension frame a. With this arrangement it will be observed that both lateral and vertical movement of the draft bar is prevented by the rollers 42, although the draft bar is free to slide longitudinally through the rollers as is necessary in the operation of the device. The pivot bolt 44 can be moved from one opening 37 to another in order to vary the angle of the draft bar 4ª under the varying conditions encountered in the use of the plow. While this form of the invention has been shown as applied to the modification shown by Fig. 3, it will be obvious that it can be as well adapted to use with the invention as illustrated by Fig. 1.

The invention has so far been illustrated and described for use in connection with tractor drawn plows, although in Fig. 7 the invention is shown as modified so as to be used in connection with one of the conventional plows adapted to be drawn by draft animals. In this figure of the drawing the frame of the plow B is shown as supported upon a furrow wheel 45, journaled upon an axle 46 the inner end of which is bent vertically and is adapted to slide through a bearing 47 rigidly secured to the frame of the plow. The other wheel of the plow is omitted for clearness in the illustration of the device. In the usual operation of a plow of this character the depth of the plow is regulated by vertical movement of the frame B upon the vertical inner end of the axle 46 of the furrow wheel, and a hand lever 48 is pivotally mounted upon the frame of the plow for raising and lowering the plow frame. This hand lever 48 is shown as connected by a link 49 to one end of a crank arm 50 rigidly applied to a horizontal shaft 51 journaled upon the frame of the plow. A second crank arm 52 which is also rigid with the shaft 51, is loosely connected by a link 53, to the vertical portion of the axle 46. It will thus be seen that by movement of the hand lever 48 the frame of the plow and the plows carried thereby can be raised and lowered through the system of levers above described. This arrangement is wholly manually operated, and it is the object of the present invention to provide means for automatically regulating the depth of the plows, and the invention is adapted to be applied to this type of plow without any modification of the plow mechanism, and substantially the only modification in the invention in applying it to this type of plow is the vertical arrangement of the depth governing lever instead of the horizontal arrangement shown in Figs. 1 to 3 inclusive. In this particular arrangement of the parts the depth governing lever 12ᶜ is shown as pivotally mounted at an intermediate point in its length at 15ᵇ upon the forward end of the plow frame, the pivot bolt 15ᵇ being adapted to be inserted interchangeably into any one of the openings 55 for the purpose of adjusting the depth governing lever. The upper end of the depth governing lever has connected thereto a link 27ª which corresponds to the chain 27 of the device as illustrated by Figs. 1 to 3 inclusive, the said link 27ª being also connected to the crank arm 50 above described. A clevis 4ᵇ which corresponds to the draft bar 4 is connected at 13ᵇ to the lower end of the depth governing lever 12ᶜ, the bolt 13ᵇ being adjustable in the openings 14ᵇ. A spring 19ᵇ corresponding to the spring 19 has one end thereof connected to the depth governing lever between the clevis and the pivot bolt 15ᵇ thereof, the opposite end of the spring being connected by means of the hooked bolt 21ˣ to a bracket 22ª rigidly secured to the frame of the plow. With this construction it will be seen that when the draft upon the plow is increased beyond a predetermined point the plow frame and plows will be automatically raised by the action of the depth governing lever 12ᶜ and link 27ª, while when the draft decreases beyond a predetermined point the spring 19ᵇ will swing the depth governing lever 12ᶜ so as to cause the frame of the plow to be lowered so as to increase the depth of the plow. For the purpose of allowing the invention to operate without actuation of the hand lever 48 the end of the link 49 connected to the hand lever is provided with an elongated slot 56 which allows considerable movement of the link without interference with the hand lever 48.

While I have shown and described several possible embodiments of my invention, it will be understood that I do not restrict myself to the exact constructions illustrated, since numerous modifications and changes can be made within the scope of the appended claims, and without departing in any manner from the spirit of the invention.

Having thus described the invention, what I claim as new and desire to secure by Letters Patent, is:—

1. A device of the character described, including a frame, a plow carried by the frame, a draft bar for pulling the frame, a depth governing lever having the draft bar connected thereto, a spring connected to the depth governing lever for yieldably resisting movement thereof by the pull of the draft bar, supporting wheels for the frame, a crank axle for one of the wheels, and an operative connection between the crank axle and the depth governing lever for lowering the frame when there is a light draft and for raising the frame when there is a heavy draft.

2. A device of the character described, including a frame, a plow carried by the frame, a slidable draft bar, a depth governing lever having the draft bar connected thereto, a spring connected to the depth governing lever and yieldably resisting swinging thereof under the action of the draft bar, supporting wheels, a crank axle carrying one of the supporting wheels, a crank arm projecting from the crank axle, and an operative connection between the depth governing lever and the crank arm of the axle for rotating the axle to raise and lower the frame according to the draft necessary to pull the plow.

3. A device of the character described, including a frame, a plow carried by the frame, a slidable draft bar, a depth governing lever pivotally mounted upon the frame and having the draft bar connected thereto, a spring connected to the depth governing lever for resisting swinging thereof under the action of the draft bar, means for regulating the tension of the spring, supporting wheels for the frame, a crank axle for one of the supporting wheels, a crank arm projecting from the crank axle, and an adjustable connection between the crank arm and the depth governing lever for rotating the crank axle to raise and lower the frame according to the draft necessary to pull the plow.

4. A device of the character described, including a frame, a plow carried by the frame, a slidable draft bar, a depth governing lever pivotally mounted upon the frame and having the draft bar connected thereto, a spring engaging the depth governing lever for resisting swinging thereof under the action of the draft bar, a series of supporting wheels, independent crank axles for the supporting wheels, and means actuated by the depth governing lever for successively rotating the independent crank axles to raise and lower the frame according to the draft thereon.

5. A device of the character described, including a frame, a plow carried by the frame, a slidable draft bar, a depth governing lever pivotally mounted upon the frame and having the draft bar connected thereto, a spring connected to the depth governing lever for yieldably resisting swinging of the lever under the action of the draft bar, a pair of supporting wheels, crank axles carrying the supporting wheels, an operative connection between one of the crank axles and the depth governing lever for causing the axle to rotate as the lever is swung, and an operative connection between the two axles for rotating the second axle after a predetermined movement of the first axle, the movements of the axles serving to raise and lower the frame according to the pull upon the draft bar.

6. A device of the character described, including a frame, a plow carried by the frame, a slidable draft bar, a depth governing lever pivotally mounted upon the frame and having the draft bar connected thereto, a spring connected to the depth governing lever for resisting movement thereof under the action of the draft bar, supporting wheels for the frame, independent crank axles for the supporting wheels, crank arms projecting from the crank axles, an operative connection between one of the crank arms and the depth controlling lever, a link connected to the said crank arm and slidably engaging the other crank arm, and stop members upon the link for engaging the second mentioned crank arm after a predetermined movement thereof, the rotation of the axles caused by movements of the crank arms serving to raise and lower the plow frame according to the pull upon the draft bar.

7. A device of the character described, including a frame, a plow carried by the frame, a sliding draft bar, yielding means interposed between the draft bar and the frame, supporting wheels for the frame, a crank axle carrying one of the supporting wheels, and an operative connection between the crank axle and the sliding draft bar for rotating the axle to raise and lower the frame according to the pull upon the draft bar.

8. A device of the character described, including a frame, a plow carried by the frame, a sliding draft bar, a yieldable connection between the draft bar and the frame, supporting wheels for the frame, crank axles carrying the supporting wheels, crank arms upon the crank axles, an operative connection between the two crank arms, and an operative connection between one of the crank arms and the draft bar.

In testimony whereof I have signed my name to this specification in the presence of two subscribing witnesses.

ANTON RUDOLPH KECKRITZ.

Witnesses:
M. F. DAVIS,
T. H. WASSON.